United States Patent

[11] 3,547,399

| [72] | Inventor | Charles E. Soderquist<br>Barrington, Ill. |
|---|---|---|
| [21] | Appl. No. | 809,237 |
| [22] | Filed | March 21, 1969 |
| [45] | Patented | Dec. 15, 1970 |
| [73] | Assignee | Nuclear Diodes, Prairie View, Ill.,<br>a Corporation of Illinois |

[54] HARD VACUUM SEAL-OFF VALVE
12 Claims, 4 Drawing Figs.

[52] U.S. Cl. .................................................. 251/86,
251/334, 251/363, 251/364
[51] Int. Cl. .................................................. F16k 25/00
[50] Field of Search .......................................... 137/533.11;
251/86, 333, 334, 360, 362, 363

[56] References Cited
UNITED STATES PATENTS

| 1,679,779 | 8/1928 | Oberhuber .................. | 251/334 |
| 2,147,332 | 2/1939 | Cornelius ..................... | 251/86 |
| 2,192,339 | 3/1940 | Wilson ......................... | 251/334 |
| 2,695,628 | 11/1954 | Wheildon ..................... | 137/533.11 |
| 2,973,179 | 2/1961 | Kleinschmidt et al. ....... | 251/86 |
| 2,998,957 | 9/1961 | Vulliez ......................... | 251/86 |

*Primary Examiner*—Henry T. Klinksiek
*Attorney*—Hume, Clement, Hume & Lee

ABSTRACT: A high vacuum seal-off valve providing a metal-to-metal seal, i.e., no elastomers, is disclosed. A cylindrical sleeve member, preferably of a relatively soft metal, is slideably received in and supported by a hollow cylindrical inlet stem of an enclosed vessel with one end portion of the sleeve positioned to define an annular valve seat. The valve member constitutes a metallic ball preferably of a relatively hard metal and having a diameter only slightly greater than the internal diameter of the sleeve. A valve closure member is connected to the ball valve by a universal-type fitting so that a self-aligning of the ball occurs on forceable seating of the metallic ball by the closure member. Additional features are disclosed.

PATENTED DEC 15 1970

3,547,399

Inventor
Charles E. Soderquist

By *Hume, Clement, Hume & Lee*
Attorneys

3,547,399

HARD VACUUM SEAL-OFF VALVE

INTRODUCTION

The present invention relates generally to valve assemblies and, more particularly, is directed to a new and improved metal-to-metal sealing valves such as are, for example, useful in high vacuum seal-off of image intensifiers or the like.

SUMMARY OF THE INVENTION

The valve assembly of the invention does not employ elastomers or other organic sealing compounds but rather provides a highly reliable vacuum seal exclusively by coaction of a metal ball valve and an associated metallic valve seat. Accordingly, the valve assembly may be exposed to the high temperatures typically encountered on "bake-out" of vacuum systems without fear of damage to the valve assembly.

The valve assembly of the invention also provides a reliable closure under moderate sealing pressures which do not deform the sealing members beyond their elastic limits. The avoidance of permanent deformation upon sealing, as well as other factors to be considered later herein, results in a valve assembly that is able to be sealed and resealed as many as one hundred times or more. Furthermore, should either the valve or the valve seat be in any way damaged, each is independently and easily replaceable so that it is not necessary to discard the entire valve structure because of damage to either of these members.

The geometry of the valve assembly, as will presently be seen, permits of a high throughput, i.e., conductance, thereby expediting evacuation of the enclosure. The valve assembly of the invention further includes an important self-aligning feature which assures that the ball-like valve member is properly centered relative to the annular valve seat without the exercise of any particular care on behalf of the attending technician.

More specifically, the valve assembly of the invention comprises a cylindrical sleeve member composed of a metal of a predetermined hardness and having a predetermined internal diameter and with one end of the sleeve member defining an annular valve seating portion. A ball-like valve member is provided for coacting with the valve seating portion to provide a high vacuum seal therebetween, the ball member being composed of a member having a hardness exceeding that of the sleeve member and having an outer diameter only slightly exceeding that of the sleeve member so that on forced seating of said ball valve the ball exerts a force axially of the sleeve member which is less than that exerted radially of the sleeve member.

DESCRIPTION OF THE PREFERRED EMBODIMENT

Figure 1:
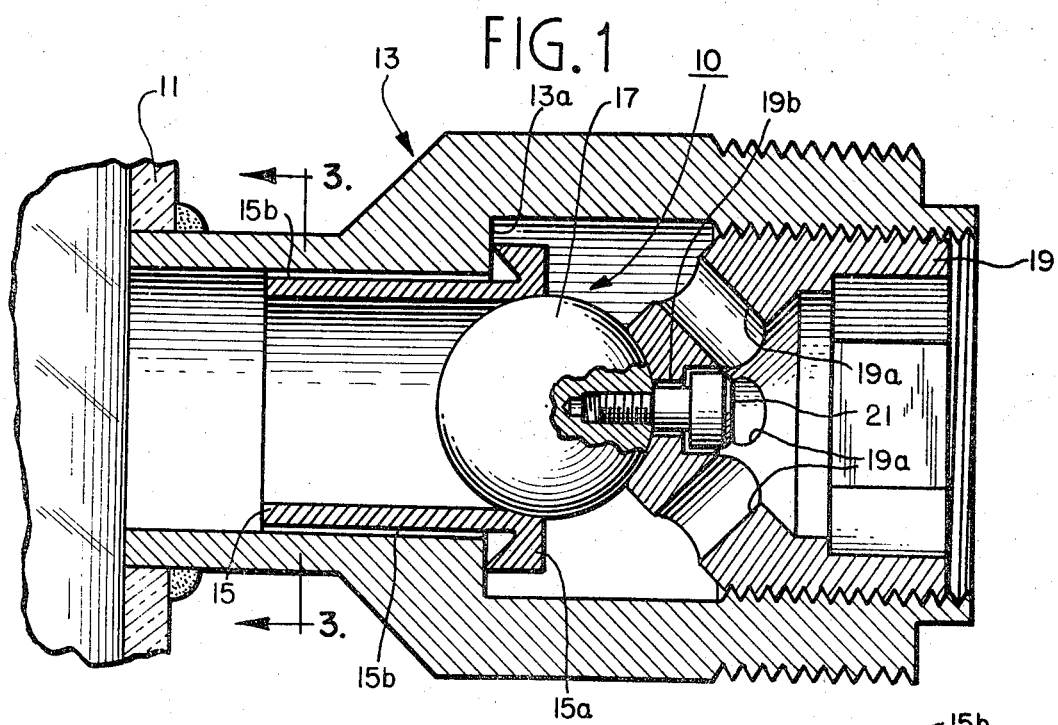
FIG. 1 is a longitudinal section of the valve assembly of the present invention as taken along the section lines 1–1 of FIG. 2.
Figure 2:
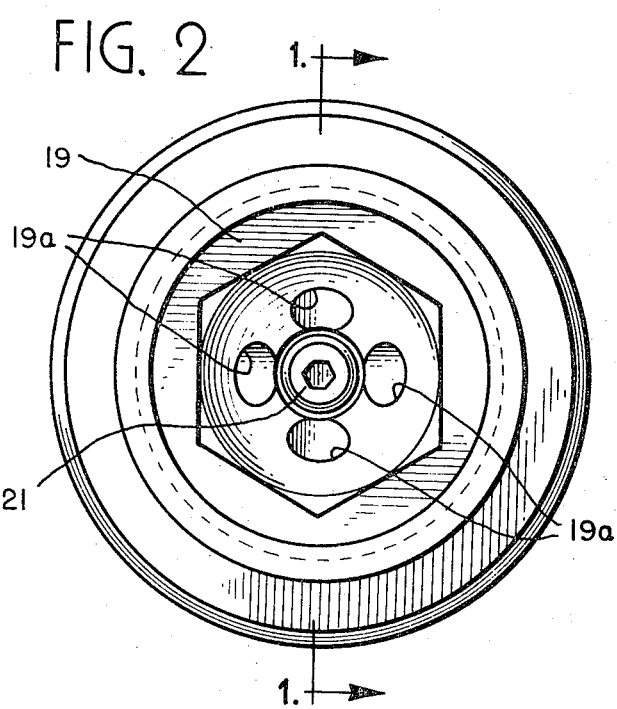
FIG. 2 is an end view of the valve assembly of FIG. 1.
Figure 3:
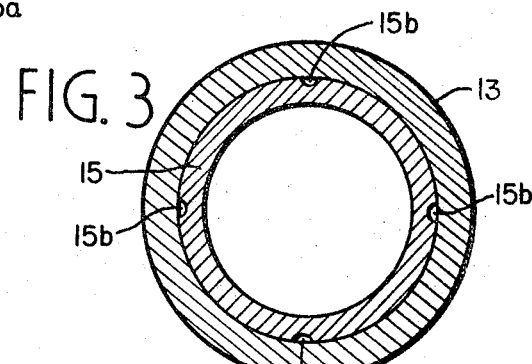
FIG. 3 is a cross-sectional view taken along lines 3–3 of FIG. 1.
Figure 4:
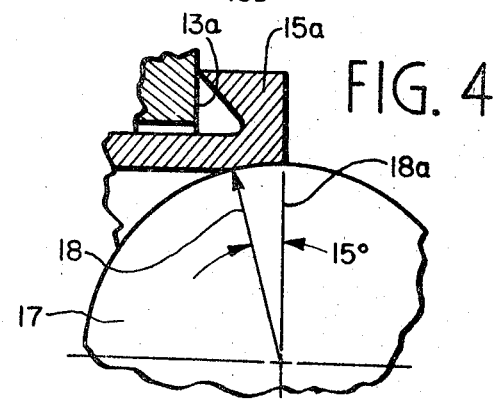
FIG. 4 is a detail view illustrating particularly the engagement of the valve and seat.

Referring now to FIG. 1, the valve assembly and associated structure of the invention are generally denoted by the reference numeral 10 while the enclosed vessel with which the valve assembly communicates is identified by the reference numeral 11. The enclosure 11, which is illustrated only in part in the drawing since its construction is not pertinent to the present invention, may be a conventional X-ray image intensifier or other vacuum device, etc. well known to the art.

In order to accommodate evacuation and sealing of the vessel 11, the usual inlet means are provided in the form of a hollow cylindrical body or stem portion 13 extending laterally of the enclosure wall and having a central passage opening into the enclosed volume of the vessel 11. As will presently be explained, valve assembly 10 is mounted or supported within the cylindrical body member 13.

The valve assembly 10 is comprised of three principal components, namely, a valve seat means 15, a valve means 17, and a closure means 19. More particularly, the valve seat means 15 comprises a hollow metallic cylindrical sleeve member that is adapted to be slideably received in a lower part of the body member 13 such that an enlarged flange or lip portion 15a of the sleeve seats against an outwardly stepped shoulder portion 13a of the hollow stem on body member 13. The lip portion 15a of the sleeve 15 is undercut about its entire perimeter as shown to provide an annular knife edge for engagement with the stepped shoulder 13a.

It is preferred that the sleeve member 15 be of a diameter such that a secure interference fit is provided between the sleeve and the concentric stem 13 in which it is received. It is further preferred for purposes of facilitating installation and removal of the sleeve that such interference fit constitute the exclusive means for supporting the sleeve 15 within the stem 13. For reasons presently to be explained, the sleeve 15 also includes a plurality of axially milled slots 15b at spaced intervals about its outer surface which slots communicate with the undercut region of the sleeve lip portion 15a.

The valve means of the assembly comprises the ball member 17 which is illustrated in sealed engagement with its associated annular valve seat defined by the internal annular rim of the sleeve lip portion 15a. The ball 17 is comprised of metal and preferably of a metal that is substantially harder than the metal of the sleeve member 15. For example, it is presently preferred that the sleeve 15 be composed of copper and that the ball 17 be formed of a hardened stainless steel. The ball 17 should have a highly polished machine finish and at least the knife edge and valve seating portions of the sleeve 15 should have a similarly uniform and smooth finish to assure proper sealing.

In conformity with the teachings of the present invention, the ball valve 17 is selected to be of a diameter that only slightly exceeds the internal diameter of the sleeve member 15. For example, in the present embodiment the ball 17 is approximately five-eights inch in diameter while the internal diameter of the sleeve 15 is approximately 0.020 inch less than this figure. A 0.010 inch interference fit is established between the ball and sleeve. Accordingly, the ball 17 is forced against the annular seating rim of the sleeve 15 with a wedge angle, i.e. the angle between a radial line 18 of the ball that is perpendicular to the axis of the sleeve and a radial line 18a drawn to the lowermost point of contact between the ball and sleeve, preferably on the order of 15°. As a consequence of this relatively high wedge angle, the force exerted by the ball axially of the sleeve 15 is less than that it exerts radially of the sleeve. This arrangement has been found to provide a reliable seal and one which is capable of repeated resealing. For example, one valve assembly constructed according to the present invention has been resealed over one hundred times without any leakage problems being encountered.

The ball-like valve 17 is forcibly positioned against its associated valve seat under the influence of the closure means or plug 19. For this purpose, the plug 19 is provided with screw threads about its outer perimeter for threadably engaging complementary threads on the interior perimeter of the stem 13. In accordance with a further aspect of the invention, the ball valve 17 is supported by the plug 19 so as to permit a universal movement therebetween. More particularly, the ball 17 and the plug 19 are maintained in an assembled relation by a screw 21 which is loosely journaled in a central bore 19b of the plug 19 and threadably received within a radial bore of the ball. This universal-type mounting feature has been found to effectively compensate for dimensional variations which otherwise might result in a misalignment of the ball with its valve seat and nonuniform sealing pressure. Such a nonuniform pressure could, of course, result in an unreliable or poor seal being effected. As a further aid in proper seating of the ball valve, the portion of the plug 19 contiguous the ball 17 is of a spherical contour complementary to that of the valve. Incidentally, it should be understood at this point that the "ball valve" need only be a spherical section although for various reasons a full sphere is preferred.

In explaining operation of the valve assembly in sealing the vessel 11, it will be understood that the plug 19 is initially unscrewed, i.e., displaced significantly to the right of its position as shown in FIG. 1, to permit unobstructed passage of the gases out of the vessel through the central passage of the sleeve 15, about the ball 17 and through the several vent ports 19a in the closure plug 19. The gases are drawn out of the system by a conventional vacuum pump (not shown) which is coupled to the vessel by a fitting attached to the exterior threads on the stem 13.

When the vessel 11 has been evacuated or a desired atmosphere established therein, the plug 19 is screwed in to advance the ball valve 17 toward its associated valve seat. As the ball valve 17 progresses into engagement with its annular seat, the ball self-aligns or centers itself on the valve seat by virtue of its manner of connection to the plug 19 as previously explained. Furthermore, the ball 17 does not rotate as the plug 19 is rotationally advanced but rather experiences only a linear movement as is preferred to avoid excessive wear or injury to the valve seat. A silicone lubricant or the like may be placed on the complementary spherical contour of the plug 19 that engages the ball 17 to further preclude any tendency of the ball to rotate although it has been found that where the components are machined to a high polish such a lubricant is unnecessary.

Only a moderate force on the order of perhaps 15 to 20 foot-pounds is necessary to perfect a secure and reliable sealing of the valve. Thus, the elastic limits of the valve components are not exceeded and such valve assemblies have been sealed and resealed one hundred times and more without permanent injury to either the valve or the valve seat. Also, since the seals of the valve assembly are provided solely by metal-to-metal engagement, exposure of the valve assembly to the high bake-out temperatures typically used in degassing vacuum devices is not harmful to the seal. In this regard, a virtual leak between the region within the undercut lip 15a of the sleeve 15 and the main enclosure volume is obviated by providing the several end mill slots 15b to assure that any contaminants within such region are vented during the bake-out procedure.

It will also be appreciated from the nature of the valve assembly that should either the valve sleeve 15 or the ball member 17 be damaged each may be easily and simply replaced without the necessity of discarding any of the undamaged components.

While a particular embodiment of the present invention has been shown and described, it is apparent that various changes and modifications may be made, and it is therefore intended in the following claims to cover all such modifications and changes as may fall within the true spirit and scope of this invention.

I claim:

1. A valve assembly adapted for sealing off an enclosed volume comprising:
    inlet means defining a passage opening into said enclosed volume;
    valve seat means, supported by said inlet means, comprising a metallic cylindrical sleeve member of a first predetermined hardness and a first predetermined diameter and having at one end an annular seating portion;
    valve means including a metallic ball-like member of a second predetermined hardness and having a predetermined diameter only slightly greater than the internal diameter of said sleeve member so as to permit said ball-like member to be slidably received within said sleeve with a predetermined interference fit; and
    valve closure means adapted for forcibly seating said metallic ball member against said seating portion to seal said enclosure.

2. The valve assembly according to claim 1 in which said predetermined radii are of a relative value such that upon seating of said valve means the seating force directed axially of said sleeve member is less than the force component directed radially of said sleeve member.

3. The valve assembly according to claim 2 in which said inlet means includes a cylindrical body having a stepped shoulder portion and said sleeve member includes an annular lip undercut to define an annular knife edge and in which said sleeve member is received within said body portion with said knife edge located against said shoulder portion of said inlet means to define an annular seal therebetween.

4. The valve assembly according to claim 3 in which said ball-like member is supported by said closure means so as to afford a universal relative movement therebetween for permitting self-alignment of said ball-like member relative to said valve seat means.

5. The valve assembly according to claim 4 in which said ball-like member is adapted to seal against said annular seating portion under the influence of a seating force less than that causing permanent deformation of said annular seating portion.

6. The valve assembly according to claim 5 in which said sleeve member is provided with at least one groove in its outer surface extending the axial length of said sleeve for venting the region adjacent said annular knife edge of said sleeve sleeve member to the interior of said enclosure to preclude a virtual leak therebetween.

7. The valve assembly according to claim 6 in which the outer diameter of said sleeve member slightly exceeds the interior diameter of said cylinder body portion for assuring a secure interference fit of said sleeve member with said body portion.

8. The valve assembly according to claim 7 in which said sleeve member is retained within said cylinder body portion only by said interference fit for facilitating removal and replacement of said sleeve member.

9. The valve assembly according to claim 8 in which said closure means includes a spherically contoured portion having a radius of curvature substantially equal to that of said ball-like member for providing firm and uniform seating of said ball-like member against said annular seating portion.

10. The valve assembly according to claim 9 in which said closure means includes a screw loosely journaled in a bore extending through said spherically contoured portion of said closure means and threadably engaging said ball-like member for maintaining said ball-like member and said closure means.

11. The valve assembly according to claim 10 in which said closure means comprises a cylindrical plug threadably engaging the interior surface of said cylindrical body means.

12. In a valve assembly for high vacuum seal-off of an image tube enclosure or the like, the combination comprising:
    a cylindrical sleeve member comprised of a metal of a predetermined hardness and having a predetermined internal diameter, one end of said sleeve member defining an annular seating portion; and
    a ball-like valve member adapted for coacting with said valve seat portion to provide a high vacuum seal therebetween, said a ball-like member comprised of a metal having a hardness exceeding that of said predetermined hardness and having an outer diameter only slightly exceeding said predetermined diameter of said sleeve member so as to permit said ball-like member to be slidably received within said sleeve with a predetermined interference fit and so that on forced seating of said valve member against a said seating portion said ball exerts a force axially of said sleeve member which is less than that exerted radially of said sleeve member.